US011530815B2

(12) United States Patent
Inskip

(10) Patent No.: US 11,530,815 B2
(45) Date of Patent: *Dec. 20, 2022

(54) FURNACE

(71) Applicant: PILKINGTON GROUP LIMITED, Lathom (GB)

(72) Inventor: Julian Inskip, Delamere (GB)

(73) Assignee: Pilkington Group Limited, Lathom (GB)

(*) Notice: Subject to any disclaimer, the term of this patent is extended or adjusted under 35 U.S.C. 154(b) by 217 days.

This patent is subject to a terminal disclaimer.

(21) Appl. No.: 16/693,564

(22) Filed: Nov. 25, 2019

(65) Prior Publication Data

US 2020/0103107 A1 Apr. 2, 2020

Related U.S. Application Data

(63) Continuation of application No. 15/534,556, filed as application No. PCT/GB2015/054054 on Dec. 17, 2015, now Pat. No. 10,551,059.

(30) Foreign Application Priority Data

Dec. 17, 2014 (GB) .................................. 1422537

(51) Int. Cl.
   *F23D 99/00* (2010.01)
   *C10B 53/07* (2006.01)
   (Continued)

(52) U.S. Cl.
   CPC .............. *F23D 91/02* (2015.07); *C03B 5/235* (2013.01); *C03B 5/237* (2013.01); *C10B 53/07* (2013.01); *C10G 1/10* (2013.01); *F23L 15/02* (2013.01); *F27D 7/02* (2013.01); *F27D 7/04* (2013.01); *F27D 17/004* (2013.01); *F27D 17/008* (2013.01); *F27D 99/0033* (2013.01); *C10G 2300/1003* (2013.01); *F23G 2206/201* (2013.01); *Y02E 20/34* (2013.01); *Y02P 20/129* (2015.11); *Y02P 20/143* (2015.11); *Y02P 40/50* (2015.11); *Y02P 40/57* (2015.11)

(58) Field of Classification Search
   CPC .... F23L 15/02; F27D 7/02; F27D 7/04; F27D 17/004; C03B 5/235; C03B 5/237
   USPC .......................................................... 431/11
   See application file for complete search history.

(56) References Cited

U.S. PATENT DOCUMENTS 5,055,122 A * 10/1991 Okumura ................ C03B 18/16
                                                          65/29.17
6,048,380 A *  4/2000 Asanuma .................. C10L 5/48
                                                          75/414
(Continued)

*Primary Examiner* — Avinash A Savani
(74) *Attorney, Agent, or Firm* — Marshall & Melhorn, LLC

(57) ABSTRACT

A furnace, and a method of firing it, wherein part of the fuel supplied to the furnace is produced from waste plastics by a depolymerisation process, waste heat from the furnace being used to promote the depolymerisation process. The furnace is equipped with regenerators for waste heat recovery and is fired alternately in first and second opposed directions, with the direction of firing periodically reversing between the first direction and the second direction. The supply of fuel to the furnace is temporarily interrupted while the direction of firing is reversing, means being provided to accommodate the fuel produced during the temporary interruption. The furnace may be used for producing glass.

20 Claims, 2 Drawing Sheets

Figure 1:
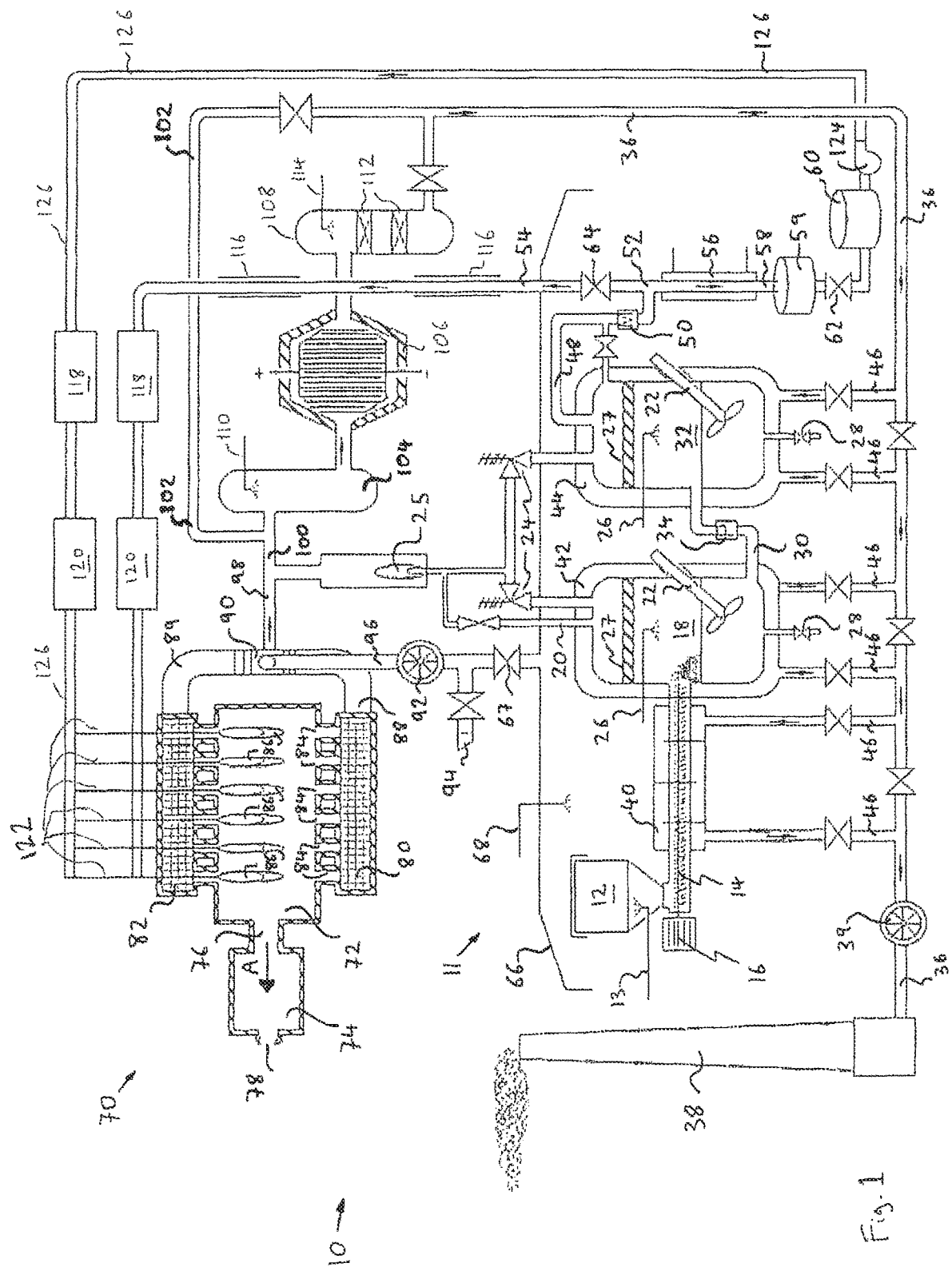

(51) Int. Cl.
  *C10G 1/10* (2006.01)
  *F23L 15/02* (2006.01)
  *F27D 7/04* (2006.01)
  *F27D 17/00* (2006.01)
  *C03B 5/235* (2006.01)
  *F27D 99/00* (2010.01)
  *C03B 5/237* (2006.01)
  *F27D 7/02* (2006.01)

(56) References Cited

U.S. PATENT DOCUMENTS

| | | | |
|---|---|---|---|
| 6,358,480 B1* | 3/2002 | Kuroki | C10B 53/07 422/184.1 |
| 2004/0050678 A1* | 3/2004 | Takahashi | C10G 1/10 202/108 |
| 2011/0020183 A1* | 1/2011 | Storchi | C10G 1/10 422/109 |
| 2012/0021367 A1* | 1/2012 | Zucchelli | C03B 5/237 432/25 |
| 2013/0118885 A1* | 5/2013 | Sarker | C10B 47/18 201/8 |

* cited by examiner

FURNACE

The present invention relates to an industrial process carried out in a furnace, to fuel production and more particularly to a method of producing fuel. The invention further relates to a method of and apparatus for producing fuel from waste plastics by a depolymerisation process. Part of the fuel for the furnace may be produced in this manner, and waste heat from the furnace may be used to promote the depolymerisation process. The furnace may be a regenerative furnace, and in a particular embodiment of the invention, the furnace may be a glass furnace.

Fuel is of course an expensive and valuable commodity, and fossil fuels are also a finite resource. Consequently much effort is directed to making industrial processes and furnaces more efficient in order to reduce their fuel consumption. An alternative strategy is to seek alternative sources of fuel which are cheaper than traditional sources such as fossil fuels.

In recent years, one of the options to which attention has been given is the production of fuel from waste plastics. Large quantities of waste plastic are generated every year, and although some is recycled, much is still disposed of into landfill sites. Only certain types of plastic are widely recycled, and some recycling processes impose a restriction on the shape of the plastic, or on the degree of contamination of the plastics that can be tolerated. This means that large quantities of waste plastics are disposed of into landfill sites; it would be advantageous if these waste plastics, which cannot currently be recycled, could be put to better use, e.g. used for the production of fuel.

In existing methods of producing fuel from waste plastics, part of the fuel produced is used to promote the depolymerisation process, i.e. to supply the energy requirements of the depolymerisation process. Since fuel is valuable, it is a disadvantage of these methods that they themselves consume a portion of their output, reducing the amount available for other uses. It has therefore been proposed to pyrolyse waste plastics using waste heat from another process.

For example, U.S. Pat. No. 6,807,916 discloses a method of pyrolysing waste materials utilising waste heat from a cement kiln, and describes a system for carrying this out. However, the pyrolysis system is restricted to waste materials which are fed into the system in drums.

It is also known to produce fuel from waste materials by gasification. Gasification is a process that converts organic or fossil fuel-based carbonaceous materials into a combustible gas. This is achieved by reacting the carbonaceous material at high or very high temperatures with a controlled amount of oxygen, but without combustion. The oxygen may be in the form of air or steam. The resulting combustible gas contains carbon monoxide, hydrogen and carbon dioxide and may be referred to as "syngas" (short for "synthetic gas"). Producer gas is a form of syngas.

US 2011/0107670 discloses a process for manufacturing a combustible gas by gasification of combustible solid or liquid materials such as biomass and/or waste products. The latter may include used tyres, plastics, auto shredder residues, sludges, replacement combustible materials or household waste. These materials may first be converted to an oil by a first pyrolysis operation. The waste products are gasified in a molten silicate bath.

However, gasification has several disadvantages. For instance, the gas produced has a low calorific value, and because the gasification process requires such high temperatures (e.g. over 1000° C.), the waste heat present in exhaust gases cannot be used to promote gasification.

It is therefore preferable to produce fuel from waste plastics by depolymerisation rather than gasification, so that waste heat present in exhaust gases can be harnessed as a source of heat. However, many furnaces, in which industrial processes are carried out, are regenerative furnaces, i.e. the furnaces are equipped with regenerators as a means of waste heat recovery. This poses particular problems for the use of the waste heat in depolymerisation, and it would of course be desirable to solve these problems.

A way has now been found of integrating fuel production by depolymerisation of waste plastics with the operation of a regenerative furnace, so that waste heat from the furnace exhaust gases can be harnessed to promote the depolymerisation.

The present invention provides a method of firing a furnace by burning fuel, comprising providing a supply of fuel to the furnace, wherein part of the fuel supplied to the furnace and burnt in the furnace is produced from waste plastics by a depolymerisation process, waste heat from the furnace being used to promote the depolymerisation process, wherein the furnace is equipped with regenerators for waste heat recovery, firing the furnace alternately in first and second opposed directions, with the direction of firing periodically reversing between the first direction and the second direction, temporarily interrupting the supply of fuel to the furnace while the direction of firing is reversing, means being provided to accommodate the fuel produced during the temporary interruption.

Preferably, substantially all the heat needed to promote the depolymerisation process is supplied from the furnace.

By using waste heat from a furnace to provide the energy requirements of the depolymerisation process, it is no longer necessary to use part of the output of the fuel production process to drive that process. Consequently this fuel becomes available for other purposes, such as firing the furnace. Since this fuel is generally of a high grade, it is clearly advantageous to use waste heat instead of fuel in the depolymerisation process, thereby saving the high grade fuel for other purposes. By means of this process, valuable fuel may be recovered from waste plastics which might otherwise have been disposed of in landfill sites. A loop is thereby created, in which waste heat from the furnace drives the depolymerisation process, and fuel produced by depolymerisation is consumed in the furnace. This loop can lead to high efficiencies and a significantly reduced cost of operation.

Using waste heat from the furnace, for which there are relatively few other uses, to promote the depolymerisation process is particularly advantageous because it means that virtually all the fuel produced by the depolymerisation process is available to burn in the furnace. Furthermore, the relatively high grade fuel typically produced by a process for producing fuel from waste plastics by depolymerisation is particularly suitable for burning in a furnace, because of its purity and its relatively high carbon content, which means that highly luminous flames can be produced if required.

References to "low grade" or "high grade" fuel refer to its calorific value, which is a widely accepted measure of the quality of a fuel.

The depolymerisation process may be a process of pyrolysis or destructive distillation, which may also be referred to as "cracking" in the context of hydrocarbons, plastics and petroleum geology. The solid material that remains after all hydrocarbons and other volatile materials have been driven off is known as char. The production and disposal of char is in practice an inevitable consequence of using waste plastics as a feed stock; this will be discussed in more detail below.

The waste plastics used as a feedstock for the process are typically waste plastics collected by municipal or local authority collection services from both domestic and commercial sources, and also industrial waste plastics. The waste plastics may comprise polyethylene (both high and low density), polypropylene, polystyrene, nylon, polyvinylchloride (PVC), polyethylene terephthalate (PET), acrylonitrile butadiene styrene (ABS) amongst others, and also a variety of different types of rubber. However, PET causes excessive char formation, and is preferably limited to no more than 5% by weight of the feedstock. Also, PVC produces hydrogen chloride on decomposition, which increases corrosion of the plant and may cause environmental pollution. Preferably the proportion of PVC in the feedstock is limited to no more than 5%, more preferably less than 1%.

While rubber is an acceptable feedstock material, it is desirable that used tyres are not included because of the steel reinforcement wires which are commonly present. Such tyres need to be shredded before they can be fed into the process, and this is an energy-intensive operation. Also the wires can damage the shredder and may become wrapped around agitators.

Waste plastics inevitably contain dirt, moisture and inert materials. Dirt and inert materials reduce the output of the process and increase production of char. Items such as stones, bricks and concrete may block or damage the equipment. Similarly, moisture not only reduces the thermal efficiency of the depolymerisation process, but also reduces the calorific value of the gaseous part of the fuel produced. The presence of water holds the feedstock at 100° C. during heating until all the water has evaporated, so extra energy is consumed before pyrolysis can start.

It is therefore preferred that the proportion of dirt and inert materials in the feedstock is less than 10% by weight, more preferably less than 5%. Similarly, the proportion of moisture in the feedstock is less than 10% by weight, more preferably less than 5%. However, since excess waste heat is frequently available from a furnace, it is feasible to include a washing and drying stage for cleaning dirty or wet waste plastics before feeding it into the depolymerisation process. Waste heat from the furnace can be used for drying the plastics.

The feedstock may contain biomass, although it is preferably present as a minority component.

A regenerative furnace, i.e. one equipped with regenerators for waste heat recovery, achieves a higher level of heat recovery than a furnace equipped with other means of waste heat recovery, such as a recuperative furnace. A regenerative furnace may be equipped with two or more regenerators, each regenerator containing a thermal storage medium of high thermal mass such as refractory bricks. At any one time, exhaust gases pass through one regenerator, giving up heat to the thermal storage medium and thereby heating the latter up, and combustion air passes through the other regenerator, absorbing heat from the thermal storage medium. After an appropriate length of time, the direction of gas flow is reversed, so a regenerative furnace is fired alternately in two different directions, namely first and second opposed directions. Even after passing through the regenerator, the exhaust gases still contain a significant amount of waste heat.

Different layouts of regenerative furnace are possible, for instance the furnace may be a side port furnace or an end port furnace. The ports are the openings in the furnace wall which lead to the regenerators. A side port furnace has ports positioned in the side walls of the furnace, and has a generally elongate, inline configuration with a longitudinal axis parallel to a production line which the furnace serves. Furthermore, a side port furnace is cross fired, with a regenerator positioned on each side of the furnace.

An end port furnace is end fired, and has typically two ports which are positioned next to each other in the end wall of the furnace. This results in the flames curving round towards the other port in a "horse shoe" configuration, and the regenerators are also positioned next to each other behind the ports at the end of the furnace. In either case, the furnace is equipped with burners positioned in the ports so that the fuel can mix appropriately with the pre-heated combustion air to yield flames of the type desired.

Any of the above types of regenerative furnace may benefit from the invention.

In both types of regenerative furnace the direction of firing is regularly reversed to maximise heat recovery. During the reversal, the burners are shut off, and so the supply of fuel is temporarily interrupted. It is therefore desirable to provide means such as a tank, chamber or receiver to accommodate the fuel produced by the depolymerisation process during the temporary interruption that occurs during the reversal.

Fuel produced by depolymerising waste plastics may contain at least 70% hydrocarbons, preferably at least 80%, more preferably at least 90% hydrocarbons. Cracking of low density polyethylene yields significant proportions of propane, propene, butane and 1-butene, whereas cracking of polypropylene yields propene, methylpropene and pentane amongst others. Other hydrocarbons produced may typically include methane, ethane, ethane and 1-pentene. The composition of the fuel produced by depolymerisation of waste plastics is therefore quite different from that of the gas produced by gasification of such plastics.

Furthermore, fuel produced by depolymerising waste plastics may have a lower heating value (LHV) in the range of 10 to 100 $MJ/Nm^3$, preferably 20 to 80 $MJ/Nm^3$, more preferably 25 to 70 $MJ/Nm^3$, most preferably 30 to 50 $MJ/Nm^3$. These values are noticeably higher than for gas produced by gasification of waste plastics.

When condensed to an oil, the fuel may have a calorific value of 20 to 70 MJ/kg, preferably 30 to 60 MJ/kg, more preferably 40 to 50 MJ/kg.

Depolymerisation of waste plastics may also be carried out at a significantly lower temperature than gasification. Typically, depolymerisation is carried out at 350° C. to 650° C., preferably at 400° C. to 450° C.

The fuel may be stored before being supplied to the furnace, or it may be supplied directly to the furnace, i.e. without storing the fuel. Storing the fuel may involve condensing it, if part or all of it is in the gaseous state.

Direct supply of the fuel to the furnace is advantageous because in many furnaces, it is necessary to heat the fuel to ignition temperature before combustion can occur. However, fuel from the depolymerisation process may already be at a sufficient temperature for use in the furnace, and by supplying the fuel directly to the furnace, the process is simplified and greater efficiency is achieved, since condensing and re-heating of the fuel is avoided.

Optionally, the fuel may be modified by fractionation or catalytic action to make it more suitable for the furnace. For instance, a fraction with a particular molecular weight may be selected. Also, control of the carbon to hydrogen ratio is desirable, with higher ratios generally being favoured. The carbon to hydrogen ratio of the fuel may range from 65% by weight to 95% by weight. With regard to aliphatic hydrocarbons, combustion of a fuel with a carbon to hydrogen ratio of around 85% yields flames of high luminosity, which have good heat transfer characteristics. Furthermore, exhaust gases produced by the flames contain less water, so less heat is lost in the form of latent heat of water in the exhaust gases.

The depolymerisation process may take place in an apparatus such as a reactor comprising a means of exchanging heat between the furnace exhaust gases and the waste plastics.

Exhaust gases containing waste heat from the furnace may be supplied directly or indirectly to the reactor. Where permitted, and when the exhaust gases are sufficiently clean not to adversely affect the reactor, e.g. where they have passed through a pollution control plant, the exhaust gases may be supplied directly to a heat exchanger in the reactor. However, when the exhaust gases are not sufficiently clean to do this, or where local legislation prohibits this, e.g. for safety reasons, or in any case safety or practical considerations make it advisable not to supply the exhaust gases direct to the reactor, a secondary (indirect) heat exchange circuit may be included. In this case, the exhaust gases are supplied to a further heat exchanger, which abstracts heat from the exhaust gases and supplies that heat to the reactor via a secondary circuit. For example, a secondary fluid may circulate between the exhaust gas heat exchanger and the reactor heat exchanger. A variety of fluids may be used for this purpose. Preferably the fluid does not contain free oxygen; inert gases such as nitrogen are particularly suitable.

It is preferable to compress the waste plastic prior to the depolymerisation process. The waste plastic, initially comprising a variety of different shapes and sizes of plastic article, will naturally be loosely packed and contain a large amount of air. It is therefore desirable to shred the waste plastic to a uniform size. If the fuel produced from the plastic contains significant quantities of air, its calorific value is reduced. Dilution of the fuel with tramp gases may also increase air pollution when the fuel is consumed.

It is therefore desirable to expel as much air as possible from the waste plastic. This may partly be achieved by compressing the waste plastic, and partly in the initial stages of melting the waste plastic. Means of compression include the use of vacuum or mechanical means, such as a screw feeder or a hydraulic ram.

Preferably, the depolymerisation process is carried out under an inert atmosphere. For instance, a nitrogen purge system may be provided. The presence of oxygen during depolymerisation is undesirable, as it causes oxidation of the hydrocarbons produced during depolymerisation, yielding carbon monoxide or dioxide and steam, thereby reducing the calorific value of the fuel produced. There would of course be a risk of explosion if a high level of oxygen were present.

The furnace may be a furnace for producing glass, i.e. a glass furnace, as used by the glass industry. The glass industry may be divided into branches such as container ware, e.g. bottles and jars, table ware, fibre glass (including both insulation and reinforcement), lighting (including tubing), pressed glass and flat glass. Any of these industrial processes may benefit from the invention.

A regenerative furnace may achieve a combustion air pre-heat temperature of 1250° C. or more. This contributes to a maximum furnace temperature of around 1600° C., or more. These high temperatures, together with a residence time of the combustion products of at least 1 second at high temperature mean that a very high degree of completeness of combustion of the fuel is achieved. This in turn reduces the risk of pollutants from incomplete combustion in the exhaust gases, and so it is particularly advantageous to integrate a process for depolymerisation of waste plastics with a regenerative furnace. Residence time of combustion products is considered to be the time from when the fuel and air first mix, forming the root of the flame, to when the temperature of the combustion products drops below 1000° C.

In most energy-intensive industrial processes, effective heat transfer from the flames to the material to be heated is important. Heat transfer by radiation is the most efficient mechanism, and highly luminous flames are desirable to enhance radiant heat transfer. Improved flame luminosity may be achieved by altering the processing of the fuel or the mix of waste plastics fed into the reactor. For instance, the waste plastic may by heated for longer in the reactor, or a catalyst may be used, or the waste plastic may make multiple passes through the reactor, or the fuel evolved may be subjected to fractionation or distillation. A combination of these approaches may also be used.

Aliphatic hydrocarbons yield more luminous flames than aromatic compounds, and as mentioned earlier, a carbon to hydrogen ratio of the aliphatic fraction of around 85% by weight is particularly suitable for producing highly luminous flames.

According to a further aspect, the invention also provides a furnace which is fired by burning fuel and a plant for producing fuel from waste plastics by a depolymerisation process, wherein the plant supplies fuel to the furnace, and waste heat from the furnace is used to promote the depolymerisation process, the furnace being equipped with regenerators for waste heat recovery, wherein the furnace is fired alternately in first and second opposed directions, with the direction of firing periodically reversing between the first direction and the second directions, means being provided to accommodate the fuel produced during the reversing of the direction of firing.

Preferably, the fuel production plant comprises a cracking reactor and a means of supplying waste heat from the furnace to the cracking reactor.

More preferably, the plant comprises a means of supplying fuel produced in the cracking reactor from the cracking reactor to the furnace.

Due to the large quantity of waste heat typically available in the exhaust gases (also known as flue gases) from a regenerative furnace, it is possible to operate a multi-stage operation to exploit the waste heat to best advantage. At their hottest, the exhaust gases may be used to promote depolymerisation of waste plastics. However, after exiting this process, the exhaust gases still contain substantial amounts of waste heat, which may be used for other purposes, e.g. to generate steam, to soften and compact waste plastics prior to or during feeding into the process, or for drying wet or washed waste plastics.

Char is preferably disposed of by heating under sub-stoichiometric conditions in a cupola furnace. The smoke produced is directed to the combustion air side of the regenerative furnace, where it is oxidised and eventually passes through the furnaces pollution control plant. Molten metal from the char is liberated at the tapping hole of the cupola furnace, and an inert mineral slag remains which may be used for aggregate, e.g. for road-building.

Figure 2:
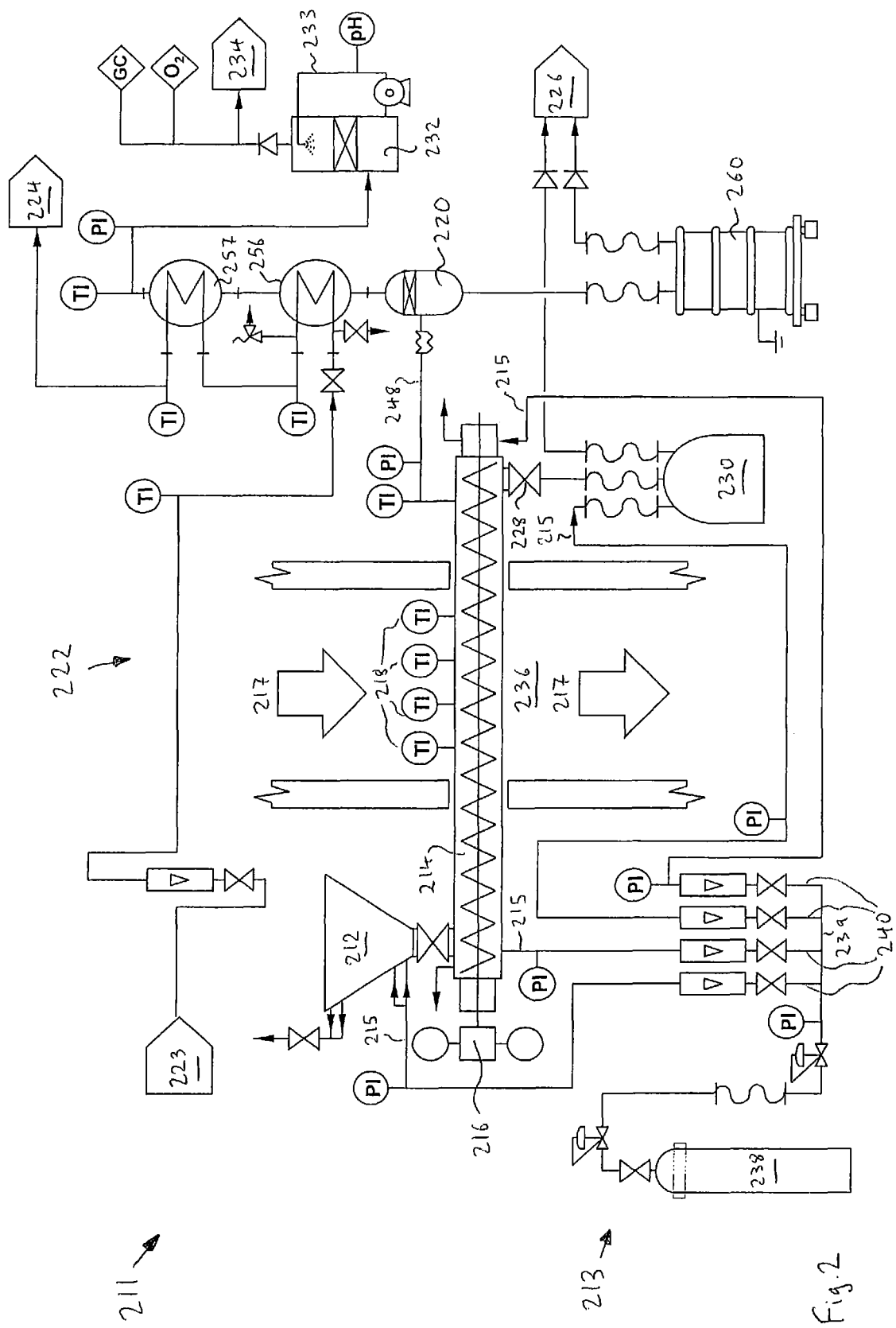

The invention will now be further described by way of the following non-limiting specific embodiments with reference to the accompanying drawings, in which:

FIG. 1 is a schematic diagram showing an apparatus comprising a furnace linked to a plant for producing fuel from waste plastics by a depolymerisation process, and FIG. 2 is a schematic diagram showing an alternative embodiment of the plant for producing fuel from waste plastics by a depolymerisation process.

Referring to FIG. 1, the drawing shows an apparatus comprising a furnace and a plant for producing fuel from waste plastics by a depolymerisation process which uses waste heat from the furnace. The furnace is a regenerative furnace, and may be a glass furnace, more specifically a float glass furnace.

The plant 11 for producing fuel from waste plastic will be described first. It may be more briefly referred to as a pyrolysis plant. Waste plastic to be pyrolysed may be subjected to initial processing, such shredding it to a uniform size. Depending on the source of the waste plastic, and the sensitivity to contaminants of the pyrolysis reactor in which the fuel is produced, the waste plastic may also be washed, dried and sorted. However, this naturally increases costs, and so is only carried out if necessary or beneficial.

Depolymerisation by pyrolysis is best performed with zero tramp gases, such as air, to dilute the fuel evolved. Dilution of the fuel with tramp gases reduces the calorific value of the fuel and also increases air pollution produced when the fuel is burnt in the furnace. In the case of oxygen, if sufficient is present in the reactor, the mixture could cause a fire hazard or a risk of explosion. The pyrolysis plant 11 is therefore provided with an inert gas purge system 13, which also acts as a fire suppressant system.

The apparatus 10 comprises a lock hopper 12 which receives waste plastic which serves as the raw material or feedstock for the depolymerisation process. The lock hopper can be sealed to prevent air ingress, and an outlet of the inert gas (e.g. nitrogen) purge 13 is provided to purge oxygen from the hopper, e.g. from air trapped within the waste plastic. The waste plastic is fed from the lock hopper 12 into the inlet of a feeding device such as a heated compaction device, which in this embodiment takes the form of a screw feeder 14 driven by an electric motor 16. Possible alternatives to a screw feeder include an extrusion feeder or a hydraulic ram.

Unlike the disclosure of U.S. Pat. No. 6,807,916, the waste plastic need not be in drums, or any other type of container. Rather, the waste plastic may be fed as a loose material, either in a continuous or an intermittent stream, e.g. via a conveyor (not shown). The rate of feeding is adjusted to maintain an appropriate level of waste plastic in the lock hopper 12.

The polymers in the waste plastic start to soften above approximately 65° C., depending on composition. This leads to natural compaction which occurs with degassing of interstitial air, this air being drawn away from the plastic to improve the calorific value of the fuel produced. The screw feeder 14 assists this process by expelling additional interstitial air from among the fragments of waste plastic.

Compaction may also be achieved via a roller, pressure plate, extruder, vacuum conveyor, vibrating conveyor, hydraulic ram, or simply gravity. Whichever apparatus or method is used, a compressive force is applied to reduce the interstitial air between the particles of shredded plastic. Size reduction occurs under gravity when the polymer reaches about 65° C. and so it is possible to arrange the pyrolysis process in a number of steps, ideally two for economic efficiency but a cascade arrangement can be adopted.

The outlet of the screw feeder is connected to a heated drying and dechlorination vessel 18, allowing a charge of compacted waste plastic to be fed into that vessel by the screw feeder. In the vessel 18 the waste plastic is heated to a temperature in the region of 180° C. to 280° C., causing it to melt. The vessel therefore contains molten plastic, and a notional liquid surface is shown in the drawing.

Trapped air and moisture are driven off from the molten plastic, as is a variety of other volatiles dependent on the type and degree of contamination of the waste plastic. Additionally, any PVC or other chlorine or bromine-containing plastics begin to decompose, releasing chlorine or bromine-containing gases. For example, hydrochloric acid may form in the vapour space of the vessel 18, which should therefore be constructed of corrosion-resistant high temperature steels, possibly coated with corrosion-resistant materials. All the evolved gases are piped away via an offtake 20 and a thermal oxidiser 25 into an exhaust flue which leads to the pollution control plant, described below.

The mixture of molten and as yet unmelted waste plastic is stirred to increase the rate of heat transfer into the plastic mixture. Also, given the extremely variable and diverse quality of waste plastic, stirring assists in improving the homogeneity of the mixture. An agitator 22 which extends into the molten plastic is therefore provided to carry out the stirring; it is preferred to agitate the mixture sufficiently to achieve turbulence.

With regard to safe operation of the vessel 18, a safety relief valve 24 is provided, which operates in the event of an excessive build-up of pressure in the vessel. A means 26 of suppressing fire is also provided, which may be part of the nitrogen purge system, and a demister 27 prevents liquid carryover into the outlets intended for gases.

There may be solid contaminants among the waste plastic, such as metal, earth, stones, etc, and other materials which do not melt at the temperatures prevailing in the vessel. A trap and outlet 28 for solid residue is provided in the base of the vessel 18.

Molten plastic leaves the vessel 18 via a conduit 30, and enters a heated cracking reactor 32, which like the vessel 18 is therefore partly filled with molten plastic. A pressure indicator 34 may be installed in the heated conduit 30. In the cracking reactor 32, the molten plastic is heated to a temperature in the range of 300° C. to 650° C., preferably 400° C. to 450° C., thereby causing the plastic to depolymerise and break down into hydrocarbons, producing fuel from the waste plastic. The actual temperature attained depends on the flue gas temperature and the throughput of waste plastic.

The fuel evolved in the cracking reactor is made up of a non-condensable gaseous phase and a condensable phase. The non-condensable gaseous phase comprises hydrocarbons and other species that are in the gaseous phase at room temperature, such as nitrogen or other contaminants. Although in theory these gases could be condensed if cooled sufficiently to reduce their temperature below their boiling points, for many hydrocarbons and other species the boiling point is well below 0° C. It is therefore not considered practical to condense these gases, and so they are regarded as a non-condensable gaseous phase. Depending on the nature of the waste plastic being pyrolysed, between 5% and 40% of the output of the cracking reactor can be in the non-condensable gaseous phase. This proportion may be modified by the use of a cracking catalyst if desired. For example, copper chromite may be used to promote the formation of ethylene gas.

The cracking reactor 32 is also provided with an agitator 22 to increase the rate of heat transfer, distribute heat through the charge and mix the molten plastic. Agitation is desirable to ensure pyrolysis is as complete as possible, and also to ensure an increased rate of pyrolysis. Indeed the rate of pyrolysis may be partly controlled by the rate of agitation. The rate of pyrolysis is dependent on the temperature and composition of the waste plastic, the rate of heat transfer to the waste plastic, and catalysis (if used). The residence time of the waste plastic in the cracking reactor may be from approximately five minutes to 1.5 hours, depending on the size of the reactor and fill level. Naturally, the longer the residence time or the larger the rate of fuel production desired, the larger the cracking reactor required.

The cracking reactor is further provided with a safety relief valve 24, a fire suppressant 26, demister 27 and a trap and outlet 28 for solid residue such as char and contaminants. The safety relief valves 24 lead to a thermal oxidiser 25 by means of which gas may be oxidised and disposed of if necessary.

The usual driving force for moving material through the depolymerisation process is gravity, apart from the initial motorised screw feeder; however, pumps or screws are an alternative means of moving material.

A main chimney flue 36 carries exhaust gases from the furnace to a chimney 38, which creates a chimney draught, and enables the exhaust gases to disperse at height. The main chimney flue 36 may also be provided with an induced draught fan 39 for use in the event that the chimney draught alone is not sufficient to pull the exhaust gases through the pollution control plant (described below). The induced draught fan 39 therefore compensates for pressure drops resulting from the pollution control plant.

The screw feeder 14, drying and dechlorination vessel 18, and cracking reactor 32 are all heated by waste heat contained in exhaust gases from the furnace. Each of the screw feeder 14, drying and dechlorination vessel 18, and cracking reactor 32 is provided with a heat exchanger for abstracting heat from the exhaust gases.

The heat exchangers shown schematically in the drawing are heating jackets 40, 42, 44, and exhaust gases are circulated around the jackets 40, 42, 44 by means of valved pipes 46. The pipes 46 for the screw feeder 14, drying and dechlorination vessel 18, and cracking reactor 32 are connected to the main chimney flue 36 in reverse order, so that the exhaust gases circulate around the jacket of the cracking reactor 32 first, the drying and dechlorination vessel 18 next, and the screw feeder 14 last. In this way, the exhaust gases are hotter, and therefore impart more heat to the cracking reactor 32, when they circulate around the jacket of the latter, than when they circulate around the jacket of the drying and dechlorination vessel 18. Similarly, the exhaust gases are relatively cooler when they circulate around the jacket of the screw feeder 14.

More sophisticated heat exchangers may be employed, e.g. those employing plates or tubes to increase the surface area over which heat may be exchanged. Arrows shown on the main chimney flue 36 and pipes 46 indicate the direction of flow of the gases.

The cracking reactor 32 is provided with an outlet pipe 48 through which the volatile products of pyrolysis, namely fuel, produced in the cracking reactor 32 leave the reactor in gaseous form. The outlet pipe 48 is equipped with a further flow meter 50, and leads to a hot fuel junction 52 from which hot fuel may either be supplied to the furnace along the hot fuel supply pipe 54, or passed through a condenser 56 via a condenser pipe 58 in order to condense the fuel into a liquid. The condenser pipe 58 then continues via an auxiliary tank 59 to a cold fuel storage tank 60 via a control valve 62, carrying the liquid fuel into the tank 60. The hot fuel supply pipe 54 is equipped with a control and isolation valve 64.

The hot gaseous fuel produced by the cracking reactor comprises condensable and non-condensable fractions. The non-condensable fraction comprises hydrocarbons and other species that are in the gas phase at room temperature. Although these species could of course be condensed if cooled sufficiently, for many of them the boiling point is below 0° C., so condensation is not practical. Consequently the non-condensable fraction cannot be condensed into a liquid and cannot be stored in the cold fuel storage tank 60. A gas storage receiver (not shown) may be provided for storage of the non-condensable fraction if required. Alternatively, during a temporary interruption to the flow of hot fuel (for example during the reversal of the regenerative furnace), the hot fuel may simply be stored in the cracking reactor by allowing the pressure in the reactor to increase temporarily. As a last resort, the fuel may be burnt via thermal oxidiser 25.

For reasons of safety and pollution avoidance, the pyrolysis plant is covered with a ventilation hood 66 for odour control and to trap gases in the event of an escape, the hood being provided with an emergency valve 67 and a fire suppressant system 68.

Turning to the furnace 70, this is built of refractory material, and may be a glass furnace, in particular a float glass furnace, as mentioned earlier. In this case the furnace comprises a melter 72 and a working end 74 connected to the melter by a waist 76. Raw materials are melted in the melter 72 to produce molten glass which flows into the working end 74 via the waist 76 in the direction of arrow A. The molten glass is conditioned in the working end 74, and then leaves the working end 74 by means of a canal 78 which leads to a glass forming means (not shown) such as a float bath or rolling machine.

The furnace 70 is a regenerative furnace and comprises two regenerators, a left-hand regenerator 80, and a right-hand regenerator 82, left and right being stated with regard to the direction of glass flow as indicated by arrow A. The left-hand regenerator 80 is positioned on the left-hand side of the furnace, and the right-hand regenerator corresponds, the furnace being symmetrical about a centre-line parallel to arrow A.

There may be multiple regenerators, and/or the regenerators may be internally divided or partitioned. Whatever the format, the regenerators are connected to the melter 72 via port necks 84. The port necks lead to ports in the superstructure of the melter, the term "superstructure" referring to the part of the refractory structure which is above the level of the molten glass. Each port is provided with a burner (not shown) suitable for the fuel which is to be burnt, e.g. natural gas, heavy fuel oil or fuel from waste plastic. As a result of the fuel meeting pre-heated combustion air, the burners produce flames 86 which extend from the burners on the side of the furnace which is firing towards the opposite side, i.e. the exhaust side.

The regenerators are connected to left and right-hand furnace flues 88, 89 along which exhaust gases leave the regenerators and combustion air enters them. More specifically, at any given time, according to the direction of firing, one regenerator pre-heats combustion air and the other regenerator absorbs heat from the exhaust gases, and a reversal valve 90 directs the flow of combustion air and exhaust gases appropriately. A combustion air fan 92 provides a supply of combustion air via a combustion air flue 96, which is also provided with an emergency combustion air inlet 94.

The length of time for which a particular furnace is fired in one direction before the direction of firing is reversed is determined by the thermal mass of the regenerators, the quality of the refractories and the temperature and rate of flow of the exhaust gases through them. The longer a furnace is fired in one direction, the hotter the refractories in the exhaust regenerator become, and this limits the time of firing in one direction. This length of time is typically between 15 and 30 minutes for most glass furnaces. During a reversal, the reversal valve 90 is actuated to direct the combustion air along the opposite furnace flue 88 to the opposite regenerator from before. The reversal valve 90 similarly changes the direction of flow of the exhaust gases.

During a reversal, the flames 86 are extinguished, and no fuel is burnt. The so-called "flame out" time may last between 25 seconds and 1 minute 30 seconds. Since the pyrolysis plant produces fuel continuously, measures are required to deal with the fuel produced during the "flame out" time, when the supply of fuel to the furnace is temporarily interrupted.

For instance, to reduce the rate of production of fuel, it is possible to stop the agitation of the pyrolysis reactor and divert the evolved gas to a storage receiver (not shown) where the pressure is allowed to rise. In addition, the gaseous fuel may be stripped of the condensable fraction by passing it through the condenser 56 during the "flame out" period to reduce the amount of gas sent to the storage receiver. The condensed liquid phase fuel may then be sent back to the pyrolysis reactor 32 or sent to the liquid fuel storage tank 60.

The high temperature gaseous fuel storage receiver can be augmented by a blower to increase the working pressure of the fuel either side of the regenerator reversal and thereby increase the functionality of the system. The storage receiver should be of an appropriate size and fitted with condensation traps to allow condensate to be safely removed and sent to the cold liquid fuel storage tank 60. A final measure deployed during plant malfunction or high pressure in the high temperature gas receiver is the process flare 25, where excess fuel may be safely burnt off.

A proportion of 0 to 100% of the condensable fraction from the pyrolysis product may be cooled and condensed and sent to the liquid fuel storage tank 60. The benefit of being able to fill the liquid fuel storage tank directly is that fuel produced in excess to the furnace requirement may be stored long term for periods when the pyrolysis plant is un-available, e.g. due to the furnace pollution control plant being off-line or following equipment failure. In addition, stirring means such as impellors may be installed within the liquid storage tank 60 to homogenise the fuel and prevent wax build-ups from accumulating in the bottom of the storage tank. Alternatively a rotating tank may be employed to agitate the fuel.

After passing through the reversal valve 90, the exhaust gases flow along the main exhaust flue 98, which is provided with a furnace pressure control valve (not shown) for regulating the pressure inside the furnace. The main exhaust flue 98 leads to a flue junction 100 at which the exhaust gases may be directed to a pollution control plant or along a pollution control plant bypass flue 102. Combustion gases produced by the flare 25 also join the exhaust gases at this flue junction.

The pollution control plant typically comprises an acid gas scrubber 104, an electrostatic precipitator 106 and a selective catalytic reactor 108, and the exhaust gases pass through each of these devices in turn. In the acid gas scrubber 104, alkali is injected via injector 110 to neutralise the exhaust gases. The exhaust gases then pass into the electrostatic precipitator 106 where a voltage is applied to precipitate dust and remove it from the exhaust gases. Next, the exhaust gases pass into the selective catalytic reactor 108 which is provided with a catalyst bed 112 and an ammonia spray 114 to reduce the nitrogen oxide gases NO and $NO_2$ to nitrogen and water.

On leaving the selective catalytic reactor 108 the cleaned exhaust gases pass into the main chimney flue 36. The pollution control plant bypass flue 102 is provided so that if for any reason the exhaust gases cannot pass through the pollution control plant, it is possible for the exhaust gases to bypass it instead.

It has already been described how integration of a pyrolysis plant with a furnace allows waste heat from the furnace to be used to promote pyrolysis of waste plastic. A further advantage of such integration is that the fuel produced by the pyrolysis plant may be used to fire the furnace. Preferably, hot fuel flows from the cracking reactor 32 directly to the furnace burners via the hot fuel supply pipe 54, which is insulated and provided with trace heating 116. The quality of the fuel is monitored at fuel quality analysis point 118 and the flow of the fuel is regulated by the fuel flow control system 120. A system of fuel delivery pipes 122 delivers the fuel to the burners in the furnace 70. For reasons of clarity, the fuel delivery pipes are shown for the right-hand burners only. Direct use of hot fuel from the cracking reactor 32 avoids the need for fuel to be cooled, stored and saves the sensible heat needed to heat it back up to combustion temperature.

In view of the fact that at times the rate of production of fuel from the pyrolysis plant may exceed the rate of consumption of fuel by the furnace, a fuel storage system is also provided. This comprises cold fuel storage tank 60, cold fuel pump 124 and cold fuel delivery pipes 126. A fuel quality analysis point 118 and a fuel flow control system 120 are also provided for fuel which has been stored in the cold fuel storage tank 60. Stored fuel may need to be reheated before it can be burnt, and so the fuel flow control system 120 may incorporate a fuel heater. The desired kinematic fuel viscosity for good atomisation and combustion in the furnace is 18.5 centistokes (18.5 cSt=$1.85e^{-5}$ $m^2$/sec), and the fuel temperature is modulated to achieve this. If necessary, a fuel heater may also be provided at the outlet of the cold fuel storage tank 60 to reduce the viscosity sufficiently to allow the fuel to be pumped.

It is prudent to provide a fuel delivery system of pipes, etc, for the hot fuel from waste plastic which is separate from the fuel delivery system for conventional fuel, so that a back-up is available.

A further facet of the proposed invention is that it is possible to deliver hot fuel directly to the furnace by avoiding a condensation step in the production process. The first stage of any combustion process is to raise the fuel temperature to the ignition temperature; this sensible heat needs to be considered when measuring thermal efficiency of a process, as, some of the thermal energy of the fuel may be used to raise the fuel to its auto-ignition temperature. As the final stage of the pyrolysis reactor 32 operates at between 300° C. and 450° C., it is possible to remove and deliver the gaseous fuel directly to the nozzles of the burners, with the temperature of the fuel only reducing due to losses from the lagged, and where necessary, trace heated delivery pipe work.

Delivery of hot fuel to the primary furnace burners at 400° C. may result in a net fuel saving of ~3%. High temperature orifice plates, which are pressure and temperature corrected, can be used to measure fuel flow rate and a gas chromatograph can be used to determine the quality of the fuel and hence the energy per unit time delivered to the furnace. A typical large regenerative float glass furnace may consume 5000 m³/hr of natural gas equivalent of fuel.

The fuel derived from the pyrolysis reactor 32 may be modified via fractionation or catalytic action to enhance the production of cracked fuel as required by the furnace. The cracked fuel output from the reactor may be equipped with a reflux condenser to return liquid fuel to the reactor for a second pass, thereby improving the efficiency of lower molecular weight fuels. In addition, the system may be equipped with fluid cracking catalysts to favour either a liquid fraction or gaseous fraction depending on whether the pyrolysis fuel is sent to storage or consumed immediately by the furnace.

FIG. 2 shows a simplified version of the plant for producing fuel from waste plastics. The main difference in this plant 211 compared with that shown in FIG. 1 is that there is no separate drying/dechlorination vessel and also no separate cracking reactor. Instead, the steps of drying, dechlorination and the pyrolysis or cracking all take place in the feeding device for the waste plastic, i.e. in the screw feeder. The screw feeder needs to be of an appropriate length in relation to the planned throughput to provide time and space for all these steps to take place. Clearly, the screw feeder also needs to be manufactured from appropriate materials which can withstand the aggressive conditions likely to be encountered, e.g. hot HCl from PVC in the waste plastics, and the relatively high temperatures (up to around 650° C. plus a safety margin) which may prevail during the pyrolysis step. However, as noted previously, these temperatures are significantly lower than those required for gasification.

As in the FIG. 1 embodiment, waste plastic is fed into a lock hopper 212, from which the plastic passes into a screw feeder 214. The screw feeder is powered by an electric motor 216, which is provided with means of measuring the current it consumes its and its rate of rotation. The screw feeder is heated by the exhaust gases of the furnace (not shown in FIG. 2), i.e. by the flue gases. The simplest way of heating the screw feeder by the flue gases is to position the screw feeder 214 in an exhaust gas flue, e.g. the main chimney flue 236. A further difference compared with the FIG. 1 embodiment results from this, namely that the heating jackets for the screw feeder and the associated pipework are dispensed with.

Means of temperature measurement 218, designated "TI" in the drawing, are provided along the screw feeder. The waste plastic is compacted, dried, dechlorinated and pyrolysed with the screw feeder. The fuel comprising the volatile products of pyrolysis leaves the screw feeder via outlet 248, and passes to a knock-out pot 220. Outlet 248 is provided with temperature indication TI and pressure indication PI.

Some initial condensation of the heaviest fractions in the fuel occurs immediately on arrival of the fuel in the knock-out pot 220, and the resulting liquid passes into a cold fuel storage tank 260. The fractions which remain gaseous pass upwards into condensers 256 and 257, which are cooled by cooling water from a cooling water system 222. The condensed fuel flows downwards through the knock-out pot 220 to the fuel storage tank 260. Both the fuel storage tank 260 and the char collection tank 230 are vented to a safe area, designated 226.

The cooling water system 222 is conventional and only the relevant part is shown, extending from the cooling water feed 223 to the cooling water return 224. Standard means of control such as temperature indicators TI, flow meters, and valves are provided.

After condensation of the condensable fractions of the fuel, the non-condensable gases pass to a storage vessel 232, which is again provided with a fire suppressant system 233. The outlet from vessel 232 conveys the gases to the furnace burners via pipe 234 for combustion in the furnace. The outlet from vessel 232 is provided with sampling points for checking the oxygen content and for analysing the composition of the gases by means of a gas chromatograph GC.

For safety reasons, and also to ensure that the calorific value of the fuel produced is not degraded by unwanted oxidation, the plant 211 is provided with an inert gas purge system 213, which also serves as a fire suppressant system. This is conventional in nature, but will be described briefly for completeness.

A source of nitrogen 238, e.g. a cylinder, provides nitrogen through appropriate valves and pressure indicator PI to a manifold 239, from which it is distributed to a series of pipes 240 which convey the nitrogen to the locations in which it is required. These locations include both ends of the lock hopper 212, the screw feeder 214, and the char collection tank 230. The pipes 240 are provided with valves, and flow indicators FI in conventional manner.

The processing capacity of the screw feeder in terms of throughput of waste plastic is governed primarily by its size, principally its diameter. However, there is an important further consideration, that of heat transfer from the flue gas, through the wall of the screw feeder, to the waste plastic inside. Mixed waste plastic has poor thermal conductivity, even when compacted, and this limits the diameter of screw feeder which may be employed. Therefore, to increase the processing capacity of the plant, multiple screw feeders are employed in parallel.

The invention claimed is:

1. A method of firing a furnace by burning fuel, comprising:
   providing a pyrolysis plant in which fuel is produced from the depolymerisation of waste plastics;
   providing a supply of fuel to the furnace and burning that fuel in the furnace, wherein part of the fuel supplied to the furnace and burnt in the furnace is produced from the depolymerisation of the waste plastics in the pyrolysis plant;
   firing the furnace alternately in first and second opposed directions, with the direction of firing periodically reversing between the first direction and the second direction;
   temporarily interrupting the supply of fuel to the furnace while the direction of firing is reversing; and
   during the temporary interruption, diverting at least some of the fuel produced by the depolymerisation of the waste plastics to a storage receiver.

2. The method of claim 1, wherein the furnace is equipped with regenerators for waste heat recovery, and the method further comprises directing waste heat from the regenerators of the furnace to the pyrolysis plant to promote the depolymerisation of the waste plastics.

3. A method of firing a furnace by burning fuel, comprising:
   providing a supply of fuel to the furnace, wherein part of the fuel supplied to the furnace and burnt in the furnace is produced from waste plastics by a depolymerisation process, waste heat from the furnace being used to promote the depolymerisation process,
   wherein the furnace is equipped with regenerators for waste heat recovery, firing the furnace alternately in first and second opposed directions, with the direction of firing periodically reversing between the first direction and the second direction, temporarily interrupting the supply of fuel to the furnace while the direction of firing is reversing, means being provided to accommodate the fuel produced during the temporary interruption.

4. The method as claimed in claim 3, wherein substantially all the heat needed to promote the depolymerisation process is supplied from the furnace.

5. The method as claimed in claim 3, wherein the fuel produced from waste plastics contains at least 70% hydrocarbons, preferably at least 80% hydrocarbons, and more preferably at least 90% hydrocarbons.

6. The method as claimed in claim 3, wherein the fuel produced from waste plastics has a lower heating value (LHV) from 10 to 100 MJ/Nm3.

7. The method as claimed in claim 3, wherein the fuel produced from waste plastics has a lower heating value (LHV) from 20 to 80 MJ/Nm3.

8. The method as claimed in claim 3, wherein the fuel produced from waste plastics has a lower heating value (LHV) from 25 to 70 MJ/Nm3.

9. The method as claimed in claim 3, wherein the fuel produced from waste plastics has a lower heating value (LHV) from 30 to 50 MJ/Nm3.

10. The method as claimed in claim 3, wherein the fuel is produced from waste plastics by depolymerisation at 350° C. to 650° C., preferably at 400° C. to 450° C.

11. The method as claimed in claim 3, wherein the fuel produced by the depolymerisation process is stored before being supplied to the furnace.

12. The method as claimed in claim 3, wherein the fuel produced by the depolymerisation process is supplied directly to the furnace, i.e. without storing the fuel.

13. The method as claimed in claim 3, wherein burning fuel in the furnace produces exhaust gases containing waste heat which is used to promote the depolymerisation process, and the depolymerisation process takes place in a reactor, which comprises means of exchanging waste heat between the exhaust gases of the furnace and the waste plastics.

14. The method as claimed in claim 13, wherein the exhaust gases are supplied directly to the reactor.

15. The method as claimed in claim 13, wherein waste heat is supplied to the reactor via a secondary circuit, the exhaust gases being supplied to a heat exchanger in the secondary circuit, the heat exchanger abstracting heat from the exhaust gases and supplying the heat to the reactor via the secondary circuit.

16. The method as claimed in claim 3, wherein the waste plastics are compressed prior to the depolymerisation process.

17. The method as claimed in claim 3, wherein the depolymerisation process is carried out under an inert atmosphere.

18. A furnace which is fired by burning fuel and a plant for producing fuel from waste plastics by a depolymerisation process, wherein the plant supplies fuel to the furnace, and waste heat from the furnace is used to promote the depolymerisation process, the furnace being equipped with regenerators for waste heat recovery, wherein the furnace is fired alternately in first and second opposed directions, with the direction of firing periodically reversing between the first direction and the second directions, means being provided to accommodate the fuel produced during the reversing of the direction of firing.

19. The furnace as claimed in claim 18, comprising a cracking reactor and a means of supplying waste heat from the furnace to the cracking reactor.

20. The furnace as claimed in claim 19, comprising a means of supplying fuel produced in the cracking reactor from the cracking reactor to the furnace.

\* \* \* \* \*